(12) United States Patent
Ivanov et al.

(10) Patent No.: US 10,310,656 B2
(45) Date of Patent: Jun. 4, 2019

(54) TOUCH-SENSITIVE SCREEN

(75) Inventors: Artem Ivanov, Landshut (DE); Axel Heim, Munich (DE); Thomas Kandiziora, Landsberg (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 619 days.

(21) Appl. No.: 14/009,291

(22) PCT Filed: Apr. 2, 2012

(86) PCT No.: PCT/EP2012/001454
§ 371 (c)(1),
(2), (4) Date: Apr. 29, 2015

(87) PCT Pub. No.: WO2012/130476
PCT Pub. Date: Oct. 4, 2012

(65) Prior Publication Data
US 2015/0227252 A1    Aug. 13, 2015

(30) Foreign Application Priority Data

Apr. 1, 2011  (DE) .......................... 10 2011 015 806

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01); *G06F 2203/04111* (2013.01)

(58) Field of Classification Search
CPC ...... G06F 3/0416; G06F 3/044; G06F 3/0412; G06F 2203/04111; G06F 2203/04101; G02F 1/133

(Continued)

(56) References Cited

U.S. PATENT DOCUMENTS

| 6,239,788 B1 | 5/2001 | Nohno et al. ................. 345/173 |
| 7,010,388 B2 | 3/2006 | Mitchell et al. .............. 700/218 |

(Continued)

FOREIGN PATENT DOCUMENTS

| JP | 2007511896 A | 5/2007 | ............. B65G 49/07 |
| TW | 341273 U | 9/2008 | ............. G06F 3/041 |

(Continued)

OTHER PUBLICATIONS

Japanese Office Action, Application No. 2014-501485, 7 pages, dated Mar. 25, 2016.

(Continued)

*Primary Examiner* — Vinh T Lam
(74) *Attorney, Agent, or Firm* — Slayden Grubert Beard PLLC

(57) ABSTRACT

A display device is provided that allows detecting contact positions (contact mode) and contactless detection of positions of a finger in front of the display device (non-contact mode). The display device includes a panel layer connected to a transparent electrode layer that is subdivided into a plurality of electrode segments that form a segment array. An interpretation circuitry coupled to the electrode segments switches between a contact mode state in which a contact detection is performed by the electrode segments, and a second state in which the contactless position or movement detection of the finger is performed in an area in front of the display device, wherein at least a part of the electrode segments are used for detection in both the contact mode and the non-contact mode, and wherein the contactless position or movement detection is performed by a grouped of the electrode segments in the segment array.

14 Claims, 4 Drawing Sheets

(58) Field of Classification Search
USPC .................................. 345/173–178; 178/18.05
See application file for complete search history.

(56) References Cited

U.S. PATENT DOCUMENTS

| | | | |
|---|---|---|---|
| 8,542,208 B2 | 9/2013 | Krah et al. ..................... 345/173 | |
| 8,860,683 B2* | 10/2014 | Baumbach .......... G06F 3/03547 345/174 | |
| 2005/0243053 A1 | 11/2005 | Liess et al. .................... 345/156 | |
| 2009/0319210 A1* | 12/2009 | Yanagisawa ........... G01R 15/16 702/64 | |
| 2010/0110041 A1* | 5/2010 | Jang ...................... G06F 3/0412 345/174 | |
| 2010/0127992 A1* | 5/2010 | Schmid .................. G06F 3/045 345/173 | |
| 2010/0194697 A1* | 8/2010 | Hotelling ............. G06F 3/0412 345/173 | |
| 2011/0007021 A1* | 1/2011 | Bernstein ............. G06F 3/0416 345/174 | |
| 2011/0096024 A1* | 4/2011 | Kwak ..................... G06F 3/044 345/174 | |
| 2011/0120784 A1* | 5/2011 | Osoinach ................ G06F 3/038 178/18.06 | |
| 2011/0164063 A1* | 7/2011 | Shimotani ............. G06F 3/0416 345/661 | |
| 2011/0193818 A1* | 8/2011 | Chen ....................... G06F 3/041 345/174 | |
| 2012/0032909 A1* | 2/2012 | Wang ................... G06F 3/0416 345/174 | |
| 2012/0044199 A1* | 2/2012 | Karpin .................. G06F 3/0416 345/174 | |
| 2012/0062498 A1* | 3/2012 | Weaver ............... G06F 3/03545 345/174 | |
| 2012/0062513 A1* | 3/2012 | Kang ...................... G06F 3/044 345/174 | |
| 2012/0127124 A1* | 5/2012 | Zanone ................. G06F 1/3231 345/174 | |
| 2012/0188183 A1* | 7/2012 | Heo ....................... G06F 3/0416 345/173 | |
| 2012/0218210 A1* | 8/2012 | DeCaro .................. G06F 3/044 345/173 | |
| 2012/0268422 A1* | 10/2012 | Hirakawa ............. G06F 1/3203 345/174 | |
| 2013/0155008 A1* | 6/2013 | Autran ................ G06F 3/03547 345/174 | |
| 2013/0201136 A1* | 8/2013 | Baard ..................... G06F 3/041 345/173 | |

FOREIGN PATENT DOCUMENTS

| | | | | |
|---|---|---|---|---|
| WO | 2010/009875 | | 7/2009 | ............... G06F 3/03 |
| WO | 2011/005977 A1 | | 1/2011 | ............. G06F 3/041 |
| WO | 2011/098496 | | 2/2011 | ............. G06F 3/044 |
| WO | 2012/130476 A1 | | 10/2012 | ............. G02F 1/133 |

OTHER PUBLICATIONS

Taiwan Office Action, Application No. 101111786, 3 pages, dated Feb. 1, 2016.
International Search Report and Written Opinion, Application No. PCT/EP2012/001454, 11 pages, dated Aug. 30, 2012.
Chinese Office Action, Application No. 201280016315.4, 14 pages, dated Jul. 8, 2016.
Korean Office Action, Application No. 20137028938, 5 pages, dated Nov. 30, 2017.
European Office Action, Application No. 12720785.0, 4 pages, dated May 15, 2018.

* cited by examiner

TOUCH-SENSITIVE SCREEN

CROSS-REFERENCE TO RELATED APPLICATIONS

This application is a U.S. National Stage Application of International Application No. PCT/EP2012/001454 filed Apr. 2, 2012, which designates the United States of America, and claims priority to DE Application No. 10 2011 015 806.5 filed Apr. 1, 2011, the contents of which are hereby incorporated by reference in their entirety.

TECHNICAL FIELD

The invention relates to a display device for visualizing image and text information in the context of a device utilization performed during an interaction with that display device. In particular the invention in this connection relates to a specific component of that display device by which the display device is given a touch-screen functionality.

BACKGROUND

Display devices comprising touch-screen functionality in particular are used in mobile communications devices, tablet PCs and navigation devices and form an interface that enables an user to perform input operations by a selective contact with the display device, wherein these input operations typically are accompanied by a user interface visualized by the display device.

Also in conventional display systems, as for example in computer displays, an implemented touch-screen function may offer appealing possibilities of interaction in order to coordinate hereby for example menu selections, cursor movements or image movements as for example the rotation of 3D objects displayed on the display system.

It is known from several patent applications of the applicant, in particular from DE 10 2009 030 495 A1 to design a display device such that besides a touch-screen function it also allows for the detection of the finger of a user before it contacts the display device. In order to also allow the detection of a position of a finger in an area in front of the display device in addition to the contact of the display also specific separate electrodes are provided in addition to the electrode system serving the contact detection which allow to detect changes of the electric properties or states in an area in front of the display device and to derive signals therefrom which allow for a relatively high resolution position detection of the finger of a user. The electrodes serving the contact detection and the electrodes for contactless position detection provided separately therefrom may be enabled consecutively by a time division multiplexer device.

SUMMARY

One embodiment provides a display device, comprising a panel layer, and a transparent electrode layer, which is connected to the panel layer, wherein this electrode layer is subdivided into a plurality of electrode segments and these electrode segments in this connection form a segment array which comprises segment rows and segment columns, an interpretation circuitry that is formed such that by that a contactless position or movement detection of a finger of the user may be performed in an area in front of the display device, and wherein the contactless position or movement detection is performed by combining several electrode segments of the segment array into a row-like or column-like electrode segment group.

In a further embodiment, the interpretation circuitry is formed such that it may adopt a circuitry state in which a contact detection is performed via the electrode segments of the electrode layer.

In a further embodiment, a switching between the circuitry state for detecting the position at contact and the switching state for position or movement detection without contact is performed by a multiplexer device.

In a further embodiment, the portion of the cycle for entering the operating condition for position or movement detection without contact is set to zero or is reduced as long as a contact is detected.

In a further embodiment, the portion of the cycle for entering the operating condition for position detection at display contact is reduced as long as no contact is detected.

In a further embodiment, in the context of the switching state intended for position or movement detection without contact at first an approximate approach detection is performed and that only at the time of a detection of a sufficiently pronounced approach state a more sensitive position detection is performed.

In a further embodiment, in the context of the switching state intended for position or movement detection without contact alternating electrode segment groups serve as sensor electrodes.

In a further embodiment, in the context of the switching state intended for position or movement detection without contact for detecting a Y position an electrode segment group is enabled, which constitutes an upper horizontal segment chain and/or that in the context of the switching state intended for position or movement detection without contact for detecting a Y position an electrode segment group is enabled, which constitutes a lower horizontal segment chain.

In a further embodiment, in the context of the switching state intended for position or movement detection without contact for detecting a X position an electrode segment group is enabled, which constitutes a left vertical segment chain.

In a further embodiment, in the context of the switching state intended for position or movement detection without contact for detecting a X position an electrode segment group is enabled, which constitutes a right vertical segment chain.

In a further embodiment, in the context of the switching state intended for position or movement detection without contact for detecting X and Y positions level values are used which are derived from electrode segment groups aligned transverse to each other, in particular perpendicular to each other.

In a further embodiment, the electrode segment groups used for detecting the position of the finger in the non-touch mode are interchanged adaptively, for example consecutively are interchanged such that the respective active electrode segment group walks across the display device in the manner of a moving row or moving column.

In a further embodiment, in the context of the switching state intended for position or movement detection without contact in each case two electrode segment groups are formed and the capacitive coupling of these two electrode segment groups is detected, and the approach state is determined from this capacitive coupling.

Another embodiment provides a touchpad component, comprising a support layer, and an electrode layer that is connected to the support layer, wherein this electrode layer is subdivided into a plurality of electrode segments and these electrode segments in this connection form a segment array, which comprises segment rows and segment columns, an interpretation circuitry that is formed such that it may adopt a circuitry state in which a contact detection is performed by the electrode segments of the electrode layer, and may adopt a circuitry state in which a contactless position or movement detection of a finger of the user may be performed in an area in front of the touchpad component, and wherein the contactless position or movement detection is performed by combining several electrode segments of the segment array into a row-like or column-like electrode segment group.

Another embodiment provides a method for generating input signals in the context of the movement of a finger of a user on a touchpad component, wherein this touchpad component comprises a support layer and an electrode that is connected to the support layer, wherein this electrode layer is subdivided into a plurality of electrode segments and these electrode segments form a segment array in this connection that comprises segment rows and segment columns, and the interpretation of the signals detected by the segment rows and segment columns is performed by an interpretation circuitry which is formed such that it may adopt a circuitry state for this in which a contact detection is performed by the electrode segments of the electrode layer, and may adopt a further circuitry state in which a contactless position or movement detection of a finger of the user may be performed in an area in front of the touchpad component, wherein the contactless position or movement detection is performed by combining several electrode segments of the segment array into a row-like or column-like electrode segment group.

BRIEF DESCRIPTION OF THE DRAWINGS

Example embodiments of the invention are discussed in detail below with reference to the figures, in which.

DETAILED DESCRIPTION

Figure 1:
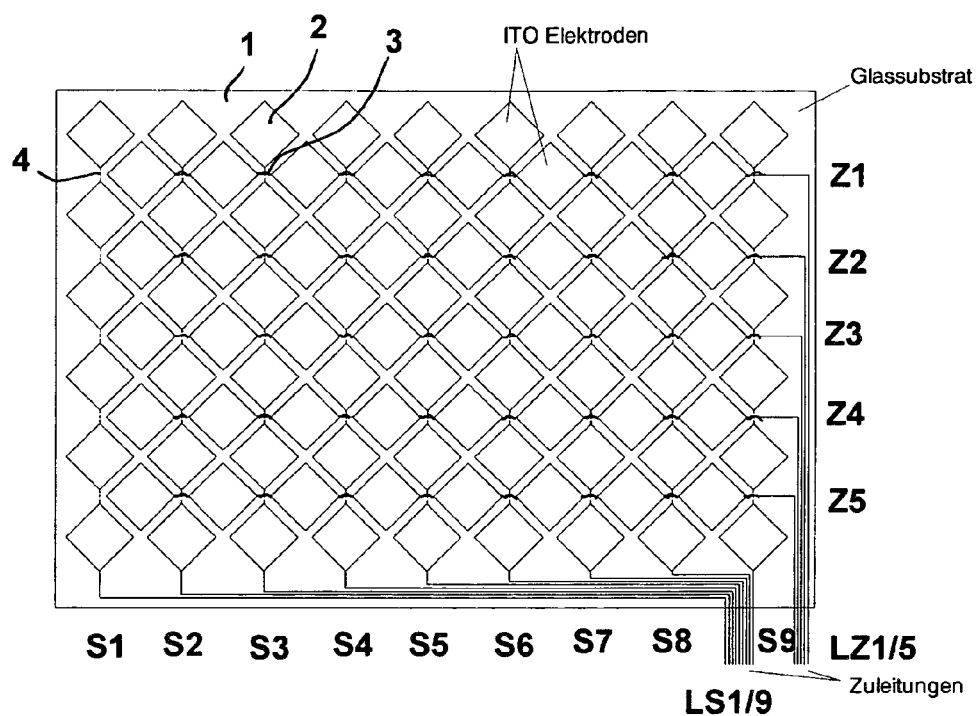
FIG. 1 shows a schematic representation for illustrating the design of a display device comprising array like arranged electrode segments, which are used for contact detection as well as for finger position detection in the non-touch mode, according to an embodiment.

Embodiments of the invention provide a display device that allows for the detection of contact positions (touch mode or contact mode) as well as the contactless detection of positions of the finger of a user in an area in front of the display device (non-touch mode or non-contact mode), wherein this display device design is robust and may be realized in a cost-effective manner.

One embodiment provides a display device comprising:
a panel layer, and
a transparent electrode layer, which is connected to the panel layer,
wherein this electrode layer is subdivided into a plurality of electrode segments and these electrode segments in this connection form a segment array, which comprises segment rows and segment columns,
an interpretation circuitry which is coupled with electrode segments and is formed such that it may adopt a circuitry state in which a contact detection is performed by the electrode segments of the electrode layer, and
further may adopt a circuitry state in which the contactless position or movement detection of a finger of the user may be performed in an area in front of the display device,
wherein at least a part of these electrode segments, which are used for detecting the position of the finger of the user in contact mode, also are used for the detection in the non contact mode, and
wherein the contactless position or movement detection is performed in such a manner that several electrode segments of the segment array are combined into an electrode group.

Thus, it is advantageously allowed for to operate the electrode segments provided for in the area of the display device and serving the contact detection as an electrode system by which a detection of the position or movement of a finger of the user may be performed before he/she touches the display device. As soon as a contact to the display device is performed, in the touch mode a position analysis may be performed by directly adjoining electrode segments or adjoining electrode segments of rows and columns crossing each other. The electrode group may comprise electrode segments that constitute an elongated chain in the display device. The chains used to detect the position of the finger in the non-touch mode may extend relatively close along the edge region of the display device. The segment chains temporarily operated as sensor electrode systems for position or movement detection may have different alignments with respect to each other, in particular they may be aligned in parallel to each other and spaced from each other. Integrated into the position detection also may be interpretation results which are based on detection events that have been derived from electrode segment chains aligned transverse to each other, in particular perpendicular to each other.

The detection of the position of a finger at contact with the display device may be performed by detecting and interpreting the coupling of the electric fields of two directly adjoining electrode segments. In order to detect this short coupling of the electric fields of the adjoining electrode segments the segment array may be designed such that a first portion of the electrode segments is combined into separate segment rows and a second portion is combined into again separate segment columns. The segment rows and the segment columns are isolated with respect to each other. The connecting ligaments between consecutive electrode segments of the respective electrode segment row are isolated against the connecting ligaments of the consecutive electrode segments of the segment columns. The respective crossover points are formed as isolating bridges by which a galvanic connection of these connecting ligaments in the crossover section is avoided. The electrode array may be formed in the manner of a field comprising closely adjoining rhombi, hexagons, polygons, or other close meshed adjoining allotments. Therefore, located in direct neighborhood adjacent to an electrode segment, which constitutes a part of a segment column, is an electrode segment, which forms part of a segment row. The point of contact of the display therefore correlates with the crossover point of that segment row and that segment column which produce the highest capacitive coupling. In the contact detection mode, the determination of the X and Y positions thus is performed by detecting the crossover points comprising high capacitive coupling. The point of contact in the touch mode further also may be detected by determining which segment row and which segment column have the highest capacitive coupling with the finger of the user. The contact position then relates to the crossover point of this segment row with that segment column. However, in the non-touch mode the detection of the X and Y positions is performed such as for the capacitive coupling of several segment columns and several segment rows respective position dependent signal levels are detected, which are indicative for the distance of the finger from the respective segment row and the respective segment column. From these level values then the position of the finger may be calculated, or at least the path of movement of the finger may be described. This calculation may be performed by processing several basic approaches, e.g., weighted amongst each other, for example triangulation and trilateration approaches matched to different electrode segment groups and group combinations. At first, the capacitive coupling with respect to ground, or another voltage coupling across the segment rows and segment columns is detected as an analog value. This analog level then is converted by an ADC system and subjected to a digital data processing.

In one embodiment the detection of the position or the movement in the non-touch mode with a substantially rectangular display device is performed by using the segment rows and segment columns located close to the edge regions. These segment rows and segment columns located close to the edge region here constitute an electrode frame. This electrode frame allows for detecting the X position of the finger of a user by interpretation of the finger induced capacitive coupling of the segment columns close to the edge region against ground. The Y position of the finger may be determined by the finger induced capacitive coupling of the upper and the lower horizontal segment row against ground. The potential opposite to ground may be applied to a transparent electrode layer, which substantially extends across the full plane on a backside of the panel layer averted from the user, i.e. on the backside of the electrode segment array averted from the user.

The switching between a first circuitry state and a second circuitry state may be performed by a multiplexer device. This multiplexer device may be performed as a time division multiplexer device, which provides a particular time phase for the non-touch mode and a particular time phase for the touch mode. It also is feasible to use particular groups of electrode segments consecutively as electrode segment chains for the position and movement detection in the non-touch mode in a program controlled manner and in parallel particular electrode segment chains for a two dimensional position detection in the touch mode. Then, the user interface may be designed such that for the areas whose electrode segment chains are used for the non-touch position detection it does not require touch detection functionality.

Touch detection mode and non-touch detection mode may be performed consecutively by circuitry-wise methods, or may be performed simultaneously. With consecutive enabling, instead of a fixed definition of the period of the respective mode, the changeover between the respective modes may be adjusted such that, for example, the portion of the cycle for adopting the second operating state (of the non-touch mode) is set to zero, or is reduced, as long as a contact is detected. A contact may be detected, when the capacitive coupling of an electrode segment row and an electrode segment column to each other, or in each case against ground, exceeds a particular threshold. By suppressing the non-touch analysis mode the signal processing may be simplified, since the signal interpretation in the touch mode may be performed using less sensitivity and simpler interpretation operations than in the non-touch mode. Analogously, in an advantageous manner the portion of the cycle for adopting the first operation state is reduced as long as no contact is detected. Since the contact event can be detected particularly reliable, however, even then, when for example no approach fulfilling a contact indicative of a limit criterion is detected, in certain, however relatively large time distances a contact detection is performed in order to achieve hereby a gain in functional safety.

The non-touch mode may be subdivided into at least two sub-modes. The first sub-mode is a large distance mode. In this, for example, only a wake-up function and a coarse detection of a Z-axis distance (a distance substantially perpendicular to the display) are determined. Only when falling below a minimum distance in Z-direction, the processing of a second sub-mode is performed. In this a more sensitive position detection is performed by interpretation of the coupling of the electrode group constituted by the electrode segments against ground or by interpretation of a field coupled into this electrode group. The distance limit, where an underrun leads to a detection of the X, Y and Z position for example corresponds to a distance at which the segment rows and segment columns located at the edge already allow for a sufficiently precise position detection. According to experimental examinations these conditions are given on a regular basis when the distance of the finger from the display is smaller than about ⅔ of the diagonal measure of the display.

In the context of the second switching state different electrode segment groups may be enabled consecutively when a minimum distance is underrun. The electrode segment rows and electrode segment columns used for position detection in the non-touch mode therefore may "migrate" on the display and thus may adopt optimized detection positions for the respective finger position. Also, several electrode segment rows and electrode segment columns may be enabled and interpreted concurrently. The electrode segment groups enabled concurrently may be rows or columns spaced from each other, or also rows and columns extending transverse to each other. For medium distances, i.e. distances from 25% to 50% of the display diagonal, the position of the finger may be determined by triangulation and trilateration, in particular by interpretation of the analog signal levels of the segment rows and segment columns located close to the edge region. During further approach the position of the finger may be determined as the crossover point of the segment column and segment row comprising the highest capacitive coupling against ground, or from other significant electric potentials. The Z distance then may be determined from the respective level of the capacitive coupling against ground or the level of the electric potential. The concept of the crossover point and the concept of trilateration also may be used together for the position detection, in particular weighted in a linked manner.

In the second switching state, i.e. the non-touch mode, a first electrode group may be enabled which constitutes an upper horizontal segment chain located close to the edge region and a second electrode group is enabled, which constitutes horizontal segment chain located close to the edge region. Then, the Y position of the finger located between these horizontal borders may be calculated by these two electrode segment groups.

For the detection of the X position in the second switching state (non-touch mode) electrode groups may be used, which constitute a left vertical segment chain located close to the edge region and a right vertical segment chain located close to the edge region.

Furthermore it is feasible to use consecutively alternating electrode groups for the detection of the position of the fingers so that, for example, the respective interpreted electrode segment groups migrate across the display device in the manner of an adaptively switched, for example vertically migrating row or horizontally migrating column.

Furthermore, the level values of electrode segment chains aligned transverse to each other, in particular extending about perpendicular to each other, may be interpreted by respective interpretation concepts.

The detection of the X, Y and Z information may be performed, as already mentioned in the context of the second switching state (non-touch mode), by forming electrode groups and by detecting the coupling of these electrode groups against ground. This respective coupling closely correlates with the distance of the finger from the respective electrode group. From the respective coupling values against ground, or by another coupling of electric potential caused by the finger of the user and correlating with the distance of the finger, then the distance from the respective electrode group may be determined and the position of the finger may be detected from the different distance values.

As an example the interpretation circuitry may be designed as an ASIC and may be located in direct proximity of the panel layer of the display device. The connection of the interpretation circuitry to the discrete conductor paths of the electrode segments for example may be performed by a flexible conductor path, by clip contact structures or by direct placement of the ASIC on the panel layer. The electrode segments arranged on the panel layer are connected to the ASIC via conductor path segments. Already in the region of the panel layer vertically and horizontally sequential electrode segments may be combined into electrode rows and electrode columns, wherein these columns and rows are isolated against each other and as an electrode segment group each are connected to the ASIC or to a multiplexer.

The electrode segments may be designed as circular disks, as rhombi, hexagons, octagons, new moon like structures or closely adjoining other polygons, or partly have intermeshing geometries. When designed as respective segments, in particular as rhombi, rhomb chains may be formed. A part of the rhombi is used to form horizontal rhomb chains, the remaining part of the rhombi is used to form vertical rhomb chains. Running between the electrode segments are small division gaps, which prevent a galvanic contact of the segments of an electrode segment row with the electrode segments of the crossing electrode segment columns. The electrode segments therefore are formed in a closely arranged manner, wherein only the electrode segments are connected to each other in a conductive manner that form a row-like or column-like chain.

The ASIC internally may be designed such that it sets the connections of the electrode segment rows and electrode segment columns such that it may be used for processing the touch mode as well as for processing the non-touch mode.

A setting may be provided in the ASIC which allows for certain system characteristics of the electrode groups as well as transition phenomena when changing between the operational modes, or the change of the group structure, to be considered.

In particular for devices that may be held single-handed, for example cell phones, in the context of signal processing it is possible to perform a calibration routine by which at first an influence to the field caused by holding the device is compensated at least to a large extent. The gesture detection in the non-touch mode at first may require a certain gesture, for example a movement of the fingertip along a virtual circular path in clockwise direction, which is performed in front of the display in a distance of about 66% of the diagonal of the display. By this special gesture the non-touch detection mode may be enabled and furthermore a calibration of the sensor system may be performed.

A view correlating with the detected position may be performed via the user interface. The transition of certain windows or menu items in the graphical user interface may be communicated acoustically, and by a mechanical feedback, for example, an electro-magnetically shifted mass element, may also become haptic.

In cases where an approach of the finger also leads to a contact with the display, the positions determined during the non-touch approach phase may be compared to the point of contact then detected in the touch mode. With the help of information at first determined during the non-touch phase and via the position information extremely reliable determined in the touch mode the interpretation parameters for consecutive detection events may be adapted by an internally implemented calibration procedure. The same is true for lifting the finger away from the display device. For the position detection in the non-touch mode, a fine automatic internal adjustment may be performed here by respective modification of internal parameters on the basis of the last definitely determined point of contact.

In particular with relatively small touch-screens the position detection may be performed such that with a larger distance of the finger from the display device the detection range for the detection of the position of the finger has larger dimensions than the display device.

The processing of X and Y positions, in particular in Y direction, may be performed such that an offset is produced here which results in that the cursor currently positioned on the display or the selected menu item are not covered by the finger of the user.

In the context of the present description, to be understood as a display contact is a soft contact of the finger onto a display panel. In this connection, the electrode systems integrated into the display device are not, or at least not required to be, contacted in a galvanic manner. Here, the finger contacts an isolating panel or film or foil element. Typically, all electrode systems provided in a display device are covered by an isolating transparent glass or plastic layer. The contacting state may be detected by sufficiently indicative signal levels for this state. The contacting state and the non-contacting state also may be detected by specific dynamic characteristics indicative for the distance to the Z axis. Typically, when touching down the finger the Z dynamics is close to zero or represents the flattening of the fingertip during increasing pressure. This phenomenon may be used as an indicator for a selection. Also in the non-touch mode the Z dynamics or certain Z dynamics criteria may be used as an indicator for a selection. For example, a Z dynamics criterion may be defined such that it is fulfilled during a quick downward movement and again upward movement of the fingertip along a short distance about perpendicular to the display. This Z dynamics criteria then describes a "virtual mouse click".

Depending on if a touch-mode or a non-touch mode is enabled the user interface may vary and in this connection have characteristics which provide specific handling advantages for the respective mode. For example, in the non-touch mode a coarser graphical menu item structure or a reduced cursor dynamics may be provided than in the touch mode.

The transverse and longitudinally oriented electrode segment chains can be activated such that a multi-point detection, in particular a detection of two fingers is allowed for thereby. To do so, for example, several zones may be generated, each of which provides values for finger positions. The enabling of this multi-point detection mode may depend on the fulfillment of certain distance criteria, or also depend on certain initially required trajectory courses, i.e. gestures. In the context of a multi-point detection mode advantageously intuitive coordinable interactions, as for example scaling operations, rotations of image content and drag and drop actions may be coordinated without the display being touched in this connection.

Other embodiments provide a touchpad component. This comprises a support layer and an electrode layer, which is connected to the support layer. The electrode layer is subdivided into a plurality of electrode segments, wherein these electrode segments form a segment array, which comprises segment rows, and segment columns. The touchpad component further comprises an interpretation circuitry that is designed such that it may adopt a circuitry state in which a contact detection is performed by the electrode segments of the electrode layer. In addition, the interpretation circuitry allows for adopting a circuitry state in which a contactless position or movement detection of a finger of the user may be performed in an area in front of the touchpad component. The contactless position or movement detection is performed with a combination of several electrode segments of the segment array into a row-like or column-like electrode segment group. This touchpad component constructional may be designed as previously described with respect to the display device. This touchpad component may be used to realize touchpads, which in addition allow for a contactless position detection. Such touchpads may be integrated at so far common integration locations for touchpads, for example in notebooks. The structure for combined detection of finger positions in the touch mode as well as also in the non-touch mode may also be integrated into other devices, in particular furniture and vehicle interiors in order to realize here in a regional restricted area a respective input zone, i.e. an input zone which also allows for non-touch interactions.

FIG. 1 shows a strongly simplified display device according to one embodiment. It comprises a panel layer 1 that is made of a transparent and isolating material. Applied to this panel layer 1 is a transparent electrode layer, which is connected to the panel layer 1. This electrode layer is subdivided into a plurality of electrode segments 2. The collective of all electrode segments 2 forms the segment array that can be seen here. This segment array forms segment rows Z1, Z2, Z3, Z4 and Z5 as well as segment columns S1, S2 . . . S9 as the respective horizontally as well as the vertically consecutively adjoining segments 2 are connected to each other by connection conductor segments 3, 4. The segment rows Z1 . . . Z5 and the segment columns S1 . . . S9 are isolated against each other and each provided with a conductor LZ1/5 and LS1/9 discretely routed across the panel layer. Provided they cross each other in the area of the display the connection conductor segments 3, 4 also are isolated against each other.

Via these supply lines LZ1/5 and LS1/9 the segment columns and segment rows are connected to an interpretation circuitry. This interpretation circuitry is formed such that it may adopt a first circuitry state, in which a contact detection is performed by the electrode segments of the electrode layer, and may adopt a second circuitry state, in which the contactless position detection of a finger of the user may be performed in an area in front of the display device, wherein the contactless position detection is performed combining several electrode segments 2 of the segment array into an electrode group, in particular electrode row Z1 . . . Z5 or electrode column S1 . . . S9.

Figure 2:
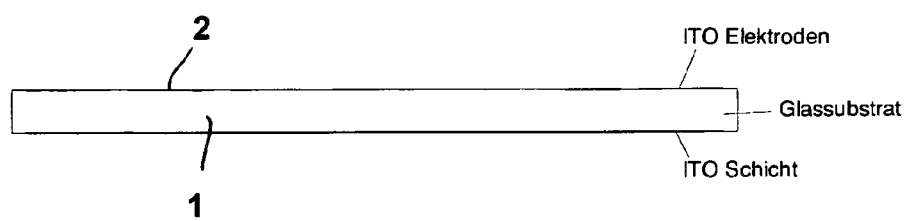
FIG. 2 shows a cross-sectional view for further illustration of the design of a display device according to an embodiment.

As an example and strongly simplified in FIG. 2 the design of a touch-display glass is shown. The panel layer 1 may consist of a plastic or glass material and has a thickness of for example 0.8 mm. On both sides on the panel layer 1 each a transparent conductive coating (for example an ITO coating) is provided.

The upper side facing to a user in the built-in and application position has a structured layer subdivided into a plurality of segments 2, which in this connection have closely adjoining segments, for example rhombi, which are segmented in rows and columns. The electric bonding of the electrode segments grouped into rows and columns is performed by dedicated supply lines. The bottom side (facing towards the display) here continuously is coated with a transparent ITO layer. The panel layer 1 designed such is arranged in front of a suitable display in order to provide to that a stat of the art touch-screen functionality. The electrode layers are covered by further transparent isolating layers not shown here, and therefore in particular from the side of the user cannot be contacted directly in a galvanic manner.

Figure 3:
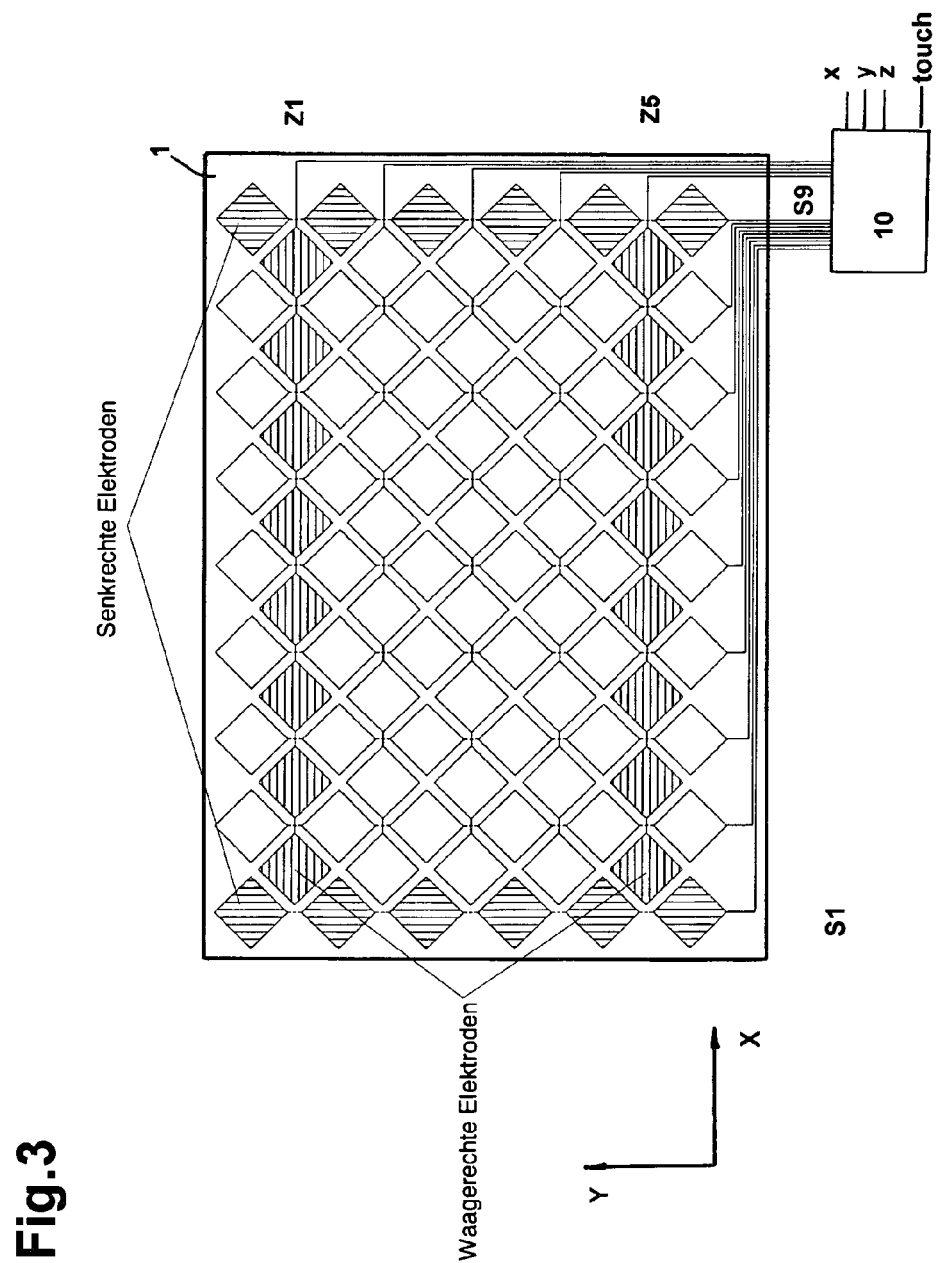
FIG. 3 shows a schematic representation for illustrating the forming of two horizontal and two vertical electrode segment groups in the electrode segment array, which temporarily are used as field electrodes for the detection of a position of the finger.

As shown in FIG. 3, in the exemplary embodiment represented here, in a respective switching state four of the rhomb chains located close to the edge region, i.e. the segment rows Z1 and Z5 formed by horizontal combination of electrode segments 2 as well as the segment columns S1 and S9 formed by vertical combination of the electrode segments 2 located close to the edge region are used for a finger position or finger movement detection on the glass. Thereby, using the electrode segments grouped into rows and columns, a "frame" comprising gesture detection electrodes is constructed.

The upper horizontal electrode segment group Z1 and the lower horizontal electrode segment group Z2, as well as the two left and right electrode segment columns S1 and S9 located close to the edge region, which are used for finger position detection in the non-touch mode, here are highlighted by crosshatching. The two horizontal electrode segment groups Z1 and Z5 are used for the detection of a Y position of the finger of a user. Simultaneously with or where applicable also directly after the detection of the Y position by these two electrode segment groups Z1 and Z5 an interpretation may be performed by which via the electrode segment column S1 in the left edge region a left elongated detection electrode is formed (left vertical rhomb chain) and by interconnection of the electrode segments in the right edge region a right electrode segment column S9 (right vertical rhomb chain) is formed. By these two electrode groups then the X position of the approached finger may be determined. Furthermore, the distance of the finger to the display device may be determined from the measurement signals. In order to determine the X and Y positions the signal levels detected by the row-like and column-like electrode segment groups also may be determined on the basis of other interpretation concepts. In particular, also electrode segment groups oriented transverse with respect to each other may be utilized for the X and Y position detection. For determining the X and Y positions different interpretation concepts may be accumulated in a weighted manner.

In a device having a respective display the positioning of the hand or of a finger may be detected beginning with the underrun of a certain distance before it touches the display. As soon as the finger of the user touches the display a state of the art touch-screen functionality is provided by using the electrode segments 2.

It is feasible to provide further electrodes in the area of the display that, for example, only serve to support the position detection in the "non-touch mode". By these additional electrodes, for example, the detection of the presence of a hand may be performed in a larger distance. Changing into an operation mode in which the touch analysis electrodes are used as position detection electrodes for contactless position detection then, for example, only is performed when a certain minimum distance is underrun. Carrying out a position detection of fingers before these touch the display may be suppressed as soon as a contact to the display was detected. Furthermore, the interpretation of the electrode segments in contact mode may be suppressed as long as a certain minimum distance not yet is underrun.

The finger position detection mode without touching (non-touch or GestIC mode) and the position of the finger detection mode comprising display contact (touch mode) may each be activated by a multiplexer, in particular a time division multiplexer. The GestIC mode may include the usage of a group driver provided for the selection of the respective electrode group, wherein bay means of this group driver it is determined which electrode segment group, or where applicable even which single electrode segments are currently used for the detection of the position of the finger in the non-touch mode. The group driver may forward the information related with the current electrode segment group to a compensation circuitry which defines certain parameters or preselections and defines reference level values which are used in the interpretation of the electric field phenomena detected by the respective electrode segment group. These parameters in particular may define the overall capacity or normal grounding of the currently active electrode system in an uninfluenced state and thereby may cause a certain pre-calibration.

The circuitry for temporarily activating the electrode segment rows and electrode segment columns, as well as the interpretation of the electric field neighborhood state detected by the activated electrode segment groups in an advantageous manner may be implemented in an ASIC 10 which may be arranged in direct proximity of the panel layer 1, in particular is connected to the panel layer 1. This ASIC 10 may be formed such that besides the detection of the position of the finger in the non-touch mode it also provides the interpretation in the touch mode, i.e. the touch-screen functionality. This ASIC 10 may be designed such that certain functions may be defined by programming. The ASIC may be designed such that it determines which electrode segment groups, in particular which electrode segment rows $Z1 \ldots Z5$ and electrode segment columns $S1 \ldots S9$ of the electrode segment array are currently used for the position detection in the non-touch mode.

The ASIC 10 itself provides the signals relating to the X and Y position as well as of the touching state in the manner of common touch-screen circuitry. In addition, the ASIC 10 also provides the Z position or signals, which provide conclusions about the distance of the finger of a user from the display before it is touched. A background program may be processed in the ASIC, which carries out a certain pre-interpretation of the detected position or movement information. In particular, in this manner also "mouse click information" may be produced by the ASIC. The ASIC 10 uses the electrode segments 2 provided for the X and Y position detection in the touch mode and from these at times selects electrode segment groups $Z1 \ldots Z5$ and $S1 \ldots S9$. These electrode segment groups $Z1 \ldots Z5$ and $S1 \ldots S9$ are connected to an interpretation system. By this interpretation system the distance, i.e. the Z position of the finger or of the hand of a user may be detected by the display. In this connection the detection is based on a change of the capacitive coupling against ground, the coupling of an electric potential, and/or the change of the dielectric characteristics of the environment of the electrode groups as a result of the penetration and positioning of the finger or of the hand in an area in front of the display device. The influencing of the dielectric characteristics of the environment of the electrode segment groups $Z1 \ldots Z5$ and $S1 \ldots S9$ by the user may be detected by the electrode groups operated temporarily as sensor electrodes using different measurement approaches. A Typical measurement concept is that, for example, the coupling of the activated electrode segment group against ground influenced by the finger of the user is detected as an analog level, i.e. level varying within a range.

Figure 4:
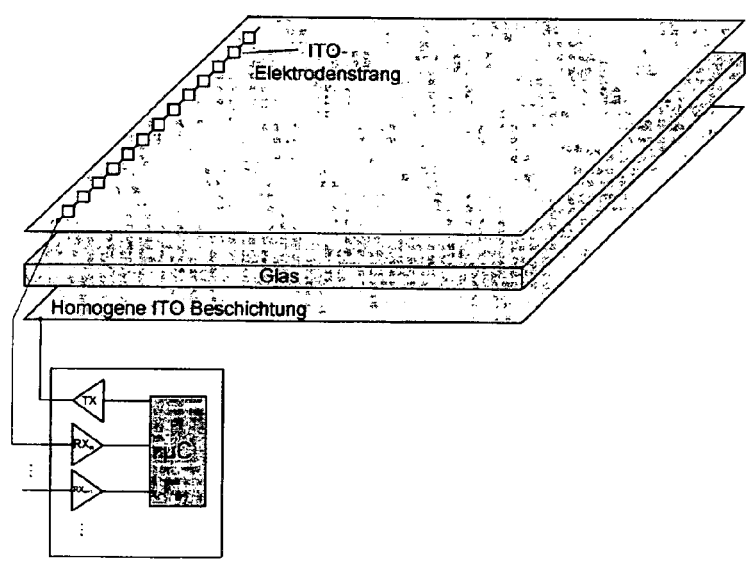
FIG. 4 shows a schematic representation for illustrating the integration of the electrode array into an interpretation circuitry.

Shown in FIG. 4 is a further exemplary embodiment of a display device or touchpad component. The circuit arrangement comprises RX and TX connections. For example, by a respective channel multiplexer it is feasible to use a plurality of electrode segment chains for contactless position detection. The interpretation of the signal levels across the respective electrode segment chains in the non-touch mode may be performed such that a multi object detection, i.e. for example the detection of two fingertips and a respective position detection is performed.

Figure 5:
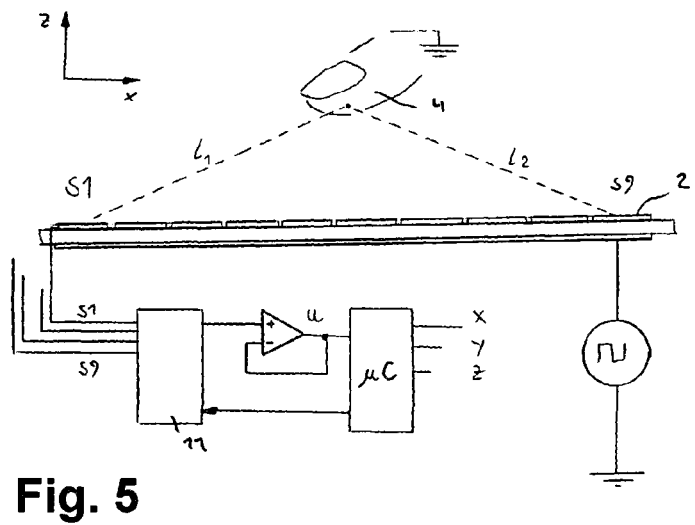
FIG. 5 shows a drawing for illustrating the determination of a X coordinate by trilateration of the voltage levels detected by the left and right segment columns.

Further illustrated in FIG. 5 in the form of a drawing is the display device and the detection of the position of a finger of a user performed therewith. Signal levels are detected by the electrode segments 2 close to the edge region and combined to segment columns S1 and S9, which are indicative for the distances 11, 12 of the fingertip 4 of the user of the display device. Then, the X position and the Z distance are calculated from these signal levels. The level detection is performed using a group driver, which consecutively connects certain electrode segment groups of the display device to an interpretation circuitry. By the amplifier illustrated in a simplified manner the voltage level is detected at the electrode group in a high-resistance manner and is transferred to the μC. That comprises an ADC and calculates the X, Y and Z coordinates of the fingertip 4 from the digital level information such derived. The display device is provided with an ITO layer on its backside averted from the electrode segments 2 to which a square-wave signal is applied.

Figure 6:
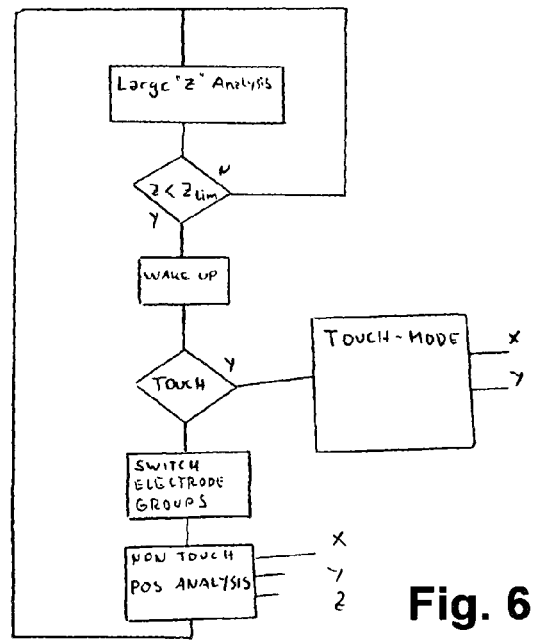
FIG. 6 shows a flow chart for describing a simple option of the position determination method according to an embodiment.

Illustrated in FIG. 6 is a simplified flow chart. As can be seen, at first it is inspected whether a certain minimum distance is underrun. If this is true, the system is switched from a simple energy saving operation mode into a main operation mode. When a touch state is detected, a detection of the point of contact is performed by the electrode segment array. This touch mode is held until the contact to the display is interrupted. As soon as the finger of the user is lifted from the display it is checked whether a certain distance limit of, for example, about 66% of the display diagonal is not exceeded. If this distance limit is not exceeded the detection system works in the non-touch mode in which consecutively activated electrode segment rows Z1 ... Z5 and electrode segment columns S1 ... S9, or only the electrode segment groups located close to the edge region, i.e. the electrode segment rows Z1 and Z5, as well as the electrode segment columns S1 and S9 of the electrode segment array are evaluated with respect to their capacitive coupling against ground. From the analog values dependent on the current position of the finger the X, Y and Z positions of the finger may be calculated.

The technique in an advantageous manner may be realized by a panel element that is provided with the well-known touch-screen electrodes, wherein these touch-screen electrodes are connected to an interpretation circuitry. The panel element then may be integrated into a display. At the side facing towards the user the electrodes of the panel element, e.g., again are covered by an isolating transparent covering layer, so that also in the touch mode no galvanic contacting of the electrode segments is performed.

The technique may qualify for mobile communication devices such as cell phones, e-books and tablet PCs.

The electrode segments of the electrode array may be integrated into a transparent multi-layer panel structure. In order to accomplish a particularly reliable isolation of the crossing bridging points between the single electrode segments, the electrode segments that constitute electrode segment rows may be arranged on a first side of a transparent and isolating layer and the electrode segments that are connected into electrode segment columns—therefore extend transverse with respect to the rows—may be arranged on a averted side of this layer, or also be arranged on a further layer. Furthermore, on the side of this sandwich structure later averted from the user a substantially full area backside shielding layer may be formed. This backside shielding layer in particular also may be formed the so-called VCOM layer of a liquid crystal structure.

Embodiments of the present invention relate to a display device, which provides touch-screen functionality as well as also non-touch position analysis functionalities, wherein these functionalities are realized by jointly used electrode segments. Embodiments may also be applied to flat structures, which directly cover a display. These flat structures may be used to realize touchpads, which in addition also allow for a contactless position detection. Such touchpads may be integrated into locations thus far traditional for touchpads, for example in notebooks. The structure for combined detection of finger positions in the touch mode as well as also in the non-touch mode also may be integrated into other equipment, in particular furniture and vehicle interior in order to realize here in a regionally limited area a respective input zone, i.e. an input zone which also allows for non-touch interactions.

What is claimed is:

1. A display device, comprising:
   a panel layer, and
   a first transparent electrode layer arranged on a top side of the panel layer and a second transparent electrode layer arranged on a bottom side of the panel layer wherein substantially the entire second transparent electrode layer forms a single electrode,
   wherein the first transparent electrode layer is subdivided into a plurality of electrode segments that form a segment array defining segment rows and segment columns substantially covering the entire panel layer, interpretation circuitry configured to:
       receive signals from the electrode segments;
       detect a contact of an object with the display device;
       during a period of contact of the object with the display device, operating the display device in a contact detection state in which the interpretation circuitry performs a contact-based position or movement detection of the object in contact with the display device using said electrode segments,
       detect an interruption in the contact of the object with the display device;
       in response to detecting the interruption in contact of the object with the display device and while detecting that the object is within a predetermined distance from the panel layer, automatically switching the display device from the contact detection state to a contactless detection state in which the single electrode formed by the second transparent electrode layer receives a signal for generating an alternating electric field and the interpretation circuitry is configured to perform a contactless position or movement detection of the object in an area in front of the display device, wherein the contactless position or movement detection is performed by selecting a most upper and a most lower row-like group and a most left and a most right column-like group of the electrode segments of the segment array wherein signal levels from the most upper and the most lower row-like groups of electrode segments and the most left and the most right column-like groups of electrode segments are used to determine a three-dimensional location.

2. The display device of claim 1, comprising wherein the interpretation circuitry comprises a multiplexer device configured to switch between the contactless detection state for performing the contactless position or movement detection and the contact state for performing the contact-based position or movement detection.

3. The display device of claim 2, wherein the multiplexer device does not switch from the contact detection state to the contactless detection state as long as a contact is detected.

4. The display device of claim 2, wherein the multiplexer device does not switch from the contactless detection state to the contact detection state when no contact is detected.

5. The display device of claim 1, wherein in the contactless detection state, the interpretation circuitry is configured an approximate approach detection is carried out and that only at a time of a detection of a sufficiently pronounced approach state a more sensitive position detection is carried out.

6. The display device of claim 1, wherein in the contactless detection state, the interpretation circuitry is configured to alternate electrode segment groups.

7. The display device of claim 1, wherein the interpretation circuitry is configured to:
   determine a separation distance between the object and the display device in the Z-Cartesian direction;
   compare the separation distance to a separation distance threshold; and
   automatically switch between operational modes of the display device in response to the separation distance crossing the separation distance threshold.

8. The display device of claim 7, wherein the interpretation circuitry is configured to:
   determine that the separation distance exceeds the separation distance threshold; and
   in response to determining that the separation distance exceeds the separation distance threshold, operate the display device in a non-contacting mode.

9. The display device of claim 1, wherein the object is a finger.

10. A touchpad component, comprising:
a support layer, and
a first electrode layer arranged on a top side of the support layer and a second electrode layer arranged on a bottom side of the support layer, wherein substantially the entire second electrode layer forms a single electrode;
wherein the first electrode layer is subdivided into a plurality of electrode segments that form a segment array defining segment rows and segment columns, wherein the electrode segments substantially cover the entire support layer including a center area of the panel layer,
interpretation circuitry configured to:
 detect a contact of an object with the touchpad component;
 operate the touchpad component in a contact detection state in which a contact detection is performed by the electrode segments of the first electrode layer,
 detect an interruption in the contact of the object with the touchpad component;
 in response to detecting the interruption in contact of the object with the touchpad component and while detecting that the object is within a predetermined distance from the support layer, automatically switching the touchpad component from the contact detection state to a contactless detection state in which the single electrode formed by the second electrode layer receives a signal for generating an alternating electric field and a contactless position or movement detection of the object is performed in an area in front of the touchpad component, wherein the contactless position or movement detection is performed by selecting only a most upper and a most lower a row-like group and a most left and a most right column-like group of the electrode segments from the segment array.

11. A method for generating input signals in a context of a movement of an object on a touchpad component that comprises a support layer and a first transparent electrode layer arranged on a top side of the support layer and subdivided into a plurality of electrode segments that form a segment array defining segment rows and segment columns, wherein the electrode segments substantially cover the entire support layer, and a second transparent electrode layer arranged on a bottom side of the support layer, wherein substantially the entire second transparent electrode layer forms a single electrode, the method comprising:
 receiving, at an interpretation circuitry, signals detected by the segment rows and segment columns, and
 determining, by the interpretation circuitry, contact between the object and the touchpad component,
 operating the touchpad component in a contact detection state in which a contact detection is performed by the electrode segments of the first electrode layer,
 detecting, by the interpretation circuitry, an interruption in the contact of the object with the touchpad component,
 in response to detecting the interruption in contact of the object with the touchpad component and while detecting that the object is within a predetermined distance from the support layer, automatically switching the touchpad component from the contact detection state to a contactless detection state in which the single electrode formed by the second transparent electrode layer receives a signal for generating an alternating electric field and a contactless position or movement detection of the object is performed in an area in front of the touchpad component, wherein the contactless position or movement detection is performed by selecting a most upper and a most lower row-like groups and a most left and a most right column-like group of the electrode segments of the segment array and determining a three-dimensional location of the object from signal levels from the most upper and the most lower row-like groups of electrode segments and the most left and the most right column-like groups of electrode segments.

12. An electrode arrangement, comprising:
a panel layer, and
a first transparent electrode layer arranged on a top side of the panel layer and a second transparent electrode layer arranged on a bottom side of the panel layer wherein substantially the entire second transparent electrode layer forms a single electrode,
wherein the first transparent electrode layer is subdivided into a plurality of electrode segments that form a segment array defining segment rows and segment columns, wherein the electrode segments substantially cover the entire panel layer,
 a multiplexer unit configured to select electrodes from said first transparent electrode layer, wherein
 in a first operating mode, the multiplexer unit is configured to select electrodes from the first transparent electrode layer, and
 in a second operating mode, the multiplexer unit is configured to only select a most upper and a most lower row-like group and a most left and a most right column-like group of the electrode segments of the segment array, and wherein the single electrode formed by the second transparent electrode layer receives a signal for generating an alternating electric field.

13. The electrode arrangement according to claim 12, wherein the first operating mode is a touch detection mode and the second operating mode is a non-touch detection mode.

14. The electrode arrangement according to claim 12, further comprising high impedance amplifiers coupled in the second operating mode with the most left and the most right column-like group of the electrode segments, respectively and providing signals for determining a position along an X-axis.

* * * * *